(12) United States Patent
Schindler

(10) Patent No.: US 6,998,090 B2
(45) Date of Patent: Feb. 14, 2006

(54) METHOD AND DEVICE FOR WORKPIECE IDENTIFICATION MARKING

(75) Inventor: Paul Schindler, Degersheim (CH)

(73) Assignee: CPAR AG, (CH)

( * ) Notice: Subject to any disclaimer, the term of this patent is extended or adjusted under 35 U.S.C. 154(b) by 360 days.

(21) Appl. No.: 10/262,633

(22) Filed: Oct. 1, 2002

(65) Prior Publication Data

US 2003/0071397 A1    Apr. 17, 2003

(30) Foreign Application Priority Data

Oct. 1, 2001  (CH) .................................. 1802/01

(51) Int. Cl.
*B23K 26/06* (2006.01)

(52) U.S. Cl. ................. 264/482; 264/400; 219/121.66; 219/121.68; 219/121.69; 219/121.81; 249/205

(58) Field of Classification Search ........... 219/121.66, 219/121.68, 121.69, 121.81; 264/400, 482; 249/205

See application file for complete search history.

(56) References Cited

U.S. PATENT DOCUMENTS

| 5,157,235 A | * | 10/1992 | Okumura et al. ...... 219/121.68 |
| 6,144,011 A | * | 11/2000 | Moss et al. ............ 219/121.68 |
| 6,248,973 B1 | * | 6/2001 | Matsumura et al. ... 219/121.69 |
| 6,313,436 B1 | * | 11/2001 | Harrison ................ 219/121.85 |

FOREIGN PATENT DOCUMENTS

EP          0 257 805 A2    2/1988

\* cited by examiner

*Primary Examiner*—Stefan Staicovici
(74) *Attorney, Agent, or Firm*—The Webb Law Firm

(57) ABSTRACT

A device for the identification marking of a workpiece which is made of a deformable material. The workpiece identification marking has a plurality of identification elements, each of which comprises elevations that project out of the surface of the workpiece. For each of the plurality of identification marking elements there is an opening in the workpiece identification marking mold of the device, through which thermal radiation can be applied to the surface of the workpiece to generate an image point, so that material that extends through the opening extends into the opening.

16 Claims, 1 Drawing Sheet

METHOD AND DEVICE FOR WORKPIECE IDENTIFICATION MARKING

BACKGROUND OF THE INVENTION

1. Field of the Invention

This invention relates to a device for workpiece identification marking of a workpiece that is made of a deformable material, whereby the workpiece identification marking has a plurality of identification marking elements, each of which comprises elevations that project out of the surface of the workpiece and/or depressions that extend into the surface of the workpiece, and which were made by molding in a workpiece identification marking mold, as well as to a method for the workpiece identification marking.

2. Description of Related Art

A similar method of the prior art is disclosed in EP 0 257 805 A2, which also relates to a reading device for such a workpiece identification marking. On injection-molded articles such as automobile tires, the prior art teaches the insertion into the mold of a die plate that carries alphanumeric characters that refer to the date of manufacture and provide additional information about the tire. The data in this identification marking can also include, among other things, the week of production, the production locations, material mixtures, type of profile and similar information. This die plate must be inserted manually, which means that in this case the precision of the marking can only be down to the level of the individual batch. The replacement of the die plate is also a more or less complex and time-consuming operation.

For quality assurance purposes, however, it is necessary to improve the ability to trace products. On other articles, this enhanced tracing capability is achieved by various complex and expensive means, e.g. by laser engraving or by printing a code. For the application of such a laser engraving or printed code, an additional processing station must be provided, by means of which the date and time can be printed with a precision down to the level of each individual piece.

SUMMARY OF THE INVENTION

Starting from this prior art, the object of the invention is to create a workpiece identification marking system which can consist of, among other things, a unique item identifying number and additional information that can be applied directly during the molding manufacturing process.

The invention is a device in which, for each of the plurality of identifying marking elements, an opening is provided in the workpiece identification marking mold of the device, through which thermal radiation can be applied to the surface of the workpiece to generate an image spot, so that material that extends beyond the opening also extends into the opening. The invention is also a method for workpiece identification marking.

The juxtaposition of unchanged image spots and surface modifications produced by thermal radiation results in a code pattern that can easily be read by corresponding sensors and reading devices.

The application of the workpiece identification marking inside the mold and directly on the base material means that there is no longer any need to provide a separate work station. Moreover, the coding can be applied in a very small space, on the order of 1 mm², which means that the application of the identification marking has no adverse effects on the function, design or shape of the workpiece.

The coding makes it possible to apply a unique code on each individual workpiece, so that it can subsequently be determined when the workpiece was manufactured, on which machine, in which mold and in which cavity. If the production specifications also require that the processing parameters of the processing machine must be recorded and stored, it is also possible at a later date to retrieve the exact production data for each individual workpiece.

BRIEF DESCRIPTION OF THE DRAWINGS

One exemplary embodiment of the invention is explained in greater detail below and is illustrated by way of example in the accompanying drawings, in which.

DETAILED DESCRIPTION OF THE PREFERRED EMBODIMENTS

Figure 1:
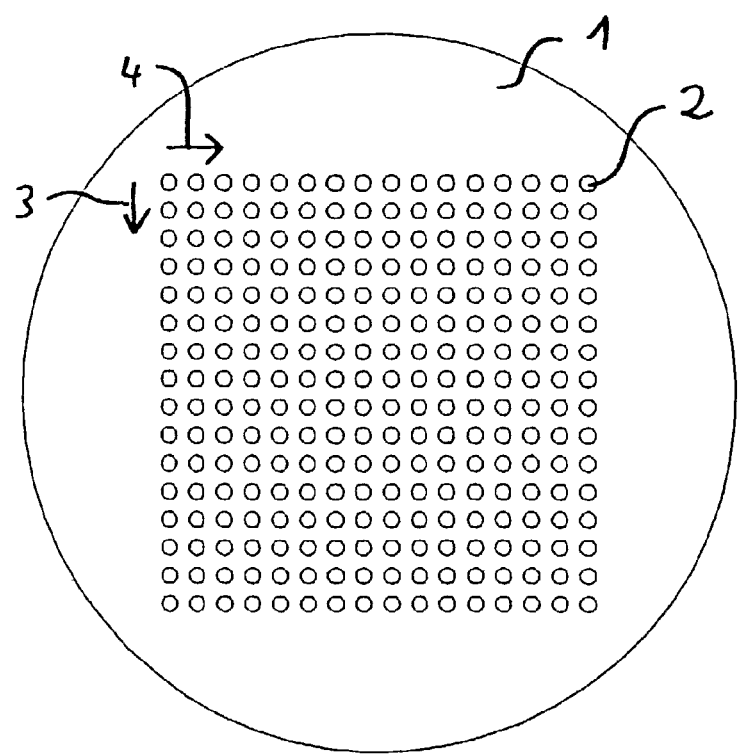
FIG. 1 is a schematic plan view from overhead of a device for applying the identification marking in one exemplary embodiment of the invention.

FIG. 1 shows a schematic view from overhead of a device for the identification marking in one exemplary embodiment of the invention, which device is located in a round base plate 1. The diameter of the base plate can be 1.5 mm, for example, so that the illustration in FIG. 1 represents an example that is enlarged by a factor of 70 times. In this base plate 1 there are number of holes 2 that have a cylindrical external surface 12, and the holes form a two-dimensional matrix with lines 3 and columns 4. In the case illustrated here, there is a square matrix ¾ of 16 times 16 holes 2, which means that that 256 items of information can be coded. However, the base plate 1 can also have other shapes, such as a rectangle, triangle or ellipse, for example, and the number of openings 2 to be coded need not be defined in advance. Nor do the openings 2 necessarily have to be circular, although a circular shape is preferred on account of the uniform maximum distance of a point from the edges of the external surface 12.

It is naturally apparent that the scope of the codable information increases as the number of openings 2 increases. With 256 openings, $2^{256}$ items of information can be represented. A more detailed description of the configuration of the openings 2 and their actuation to achieve the desired function is presented below with reference to the accompanying FIGS. 2 and 3.

Figure 2:
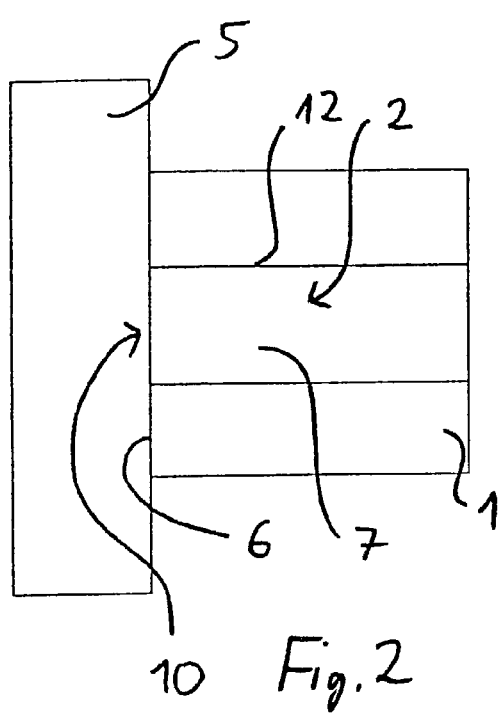
FIG. 2 is a very schematic view in cross section through an opening of an image point as shown in FIG. 1 with the adjacent material of the molding without activation of the image point.

FIG. 2 shows a very schematic view in cross section through an opening 2 of an image point 10 as illustrated in FIG. 1 with adjacent material of the molding 5, without activation of the image point 10. The schematic overview is restricted to the area around a single opening 2 with an injected material part 5. The reference number 12 thereby refers to the side walls around the hole or the opening 2, which can be round, as shown in particular in FIG. 1. Reference number 5 identifies the body of the injected material, which is naturally not applied in the form of a rectangular block, but is pressed by the injection pressure against each surface 6 of the molding. In the vicinity of the surface 6 of the base plate 1, this surface can be considered flat.

On account of the diameter of the hole 2, the injected and cured material 5 cannot penetrate into the-cavity 7 of the hole 2 and forms a flat area 10 between the surface elements 6 around the opening 2. Suitable diameters for the openings 2 are, for example, 0.01 to 0.05 millimeter, typically 0.02 millimeters. The diameter is naturally also a function of the injection pressure, the type of material injected and additional parameters which the average technician skilled in the art will be able to adapt on the basis of the information provided in this description.

Figure 3:
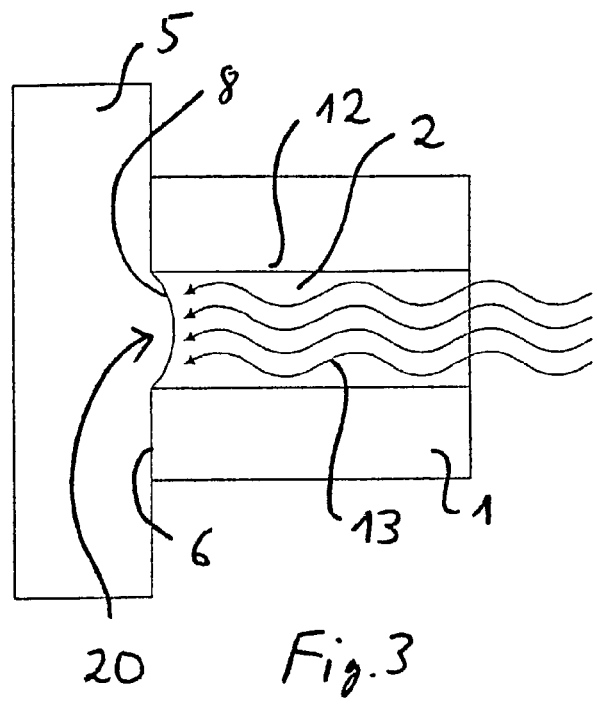
FIG. 3 is a very schematic view in cross section through an opening of an image point as shown in FIG. 1 with the adjacent material of the molding, with activation of the image point.

FIG. 3 shows a very schematic view in cross section through the opening 2 of an image point 20 as illustrated in FIG. 1 with adjacent material of the molding 5 with activation of the image point 20. The same features are identified by the same numbers in all the accompanying drawings. The image point in FIG. 3 is identified by the reference number 20, rather than the number 10 by which it is identified in FIG. 2, because it differs from the latter image point.

FIG. 3 shows essentially the same situation as FIG. 2, with the exception of a simultaneous and/or subsequent thermal action. The arrows 13 symbolize the introduction of laser radiation, for example, which is guided in the form of a parallel light beams into the hole 2 onto the essentially flat material opposite the opening 2 of the cooling molding 5. As a result of the thermal effect connected with the incident light radiation, the material flows in a convex fashion into the opening 2, whereby the term "convex" is used with respect to the material of the molding 5 and the surface of the molding.

Among other things, it is possible not to perform the irradiation with a light source provided directly in the area of the mold, but to deliver the corresponding energy via an optical fiber.

A suitable illumination unit, for example, is a laser, in particular a semi-conductor laser such as laser diodes. The exposure time depends on various factors, although it can be in particular less than 0.01 seconds, and advantageously less than 1 second. The thermal radiation is thereby preferably activated when the injection of materials has been completed and distribution processes are taking place only under a residual pressure. In one advantageous method, the individual image points 20 are not generated simultaneously but sequentially, for example by electronically coupling one or a certain number of lasers into the individual optical fibers one after another.

With these parameters, the material of the molding 5 softens in the vicinity of the opening 2 and flows, in particular on account of the injection pressure that is still being applied, and in some cases also because the only pressure is the remaining injection pressure, it flows to some extend into the cavity 7 of the opening 7. The resulting elevation 8 can have a height of, in particular, ⅓ of the diameter of the opening 2, for example between 0.003 and 0.02 millimeters, and typically 0.01 millimeters. It is essential that the bulge that is formed under the action of the heat differs significantly from the surface that the material assumes without the action of the heat, so that the difference can be detected by corresponding sensors. Larger holes 2, even without the effect of the thermal radiation, result in the formation of a surface that differs slightly from the flat surface, which within the meaning of the claims is here considered essentially flat, in contrast to the convex bulge that is formed under the action of the light.

Using this mold insert of the base plate 1 which is penetrated by many tiny holes 2, each individual hole can heat the surface of the workpiece by means of a laser beam so that the material at that point forms a small, outward bulge as a result of material that continues to flow.

The size of the hole is thereby selected so that without irradiation during normal cooling of the workpiece 5, no material can enter the hole 2. This is illustrated in FIG. 2 by means of a flat surface 6 of the image point 10. But as soon as this hole 2 is irradiated during the cooling process or afterward as illustrated in FIG. 3, the luminous energy 13 on the surface of the workpiece is converted into heat and the viscosity of the material is thereby altered so that the material at this location forms a small bulge 8 as a result means of the prevailing injection pressure or remaining pressure. In this manner, any desired individual pattern can be configured on the surface 6 of the molding for the individual workpiece, which pattern can subsequently be read and decoded by means of an appropriate measurement system. Such measurement systems include microscopes, cameras and lasers. Examples of coding systems that can be used are bar codes, 2D bar codes or other codes, in particular two-dimensional coding methods.

One essential advantage of the method and the device taught by this invention lies in the ability to apply an individual identification marking to the molding, because a unique code can be applied for each individual molding without having to change the device. The device can be actuated in a contactless manner and can be automated by means of appropriate control software.

The need to keep the size of the hole (diameter of the opening 2) small enough so that during normal cooling no material can enter the hole 2 has the additional advantage that the size of the entire code itself can be very small, e.g. from 1 to 5 mm². Thus the marking is practically invisible to the naked eye and does not interfere with the design or structure of the article, because it consists of the same material, has the same color and other properties. Naturally the distribution of the holes and in particular the distances between the individual holes can also be distributed over a larger area of the base plate 1. There is no difference in terms of function. The markings are formed by a control device or guiding means that predetermines for each of the plurality of openings 2 during a molding process of each workpiece being manufactured, whether electromagnetic radiation 13 is to be applied through the opening 2 to the surface 6 of the workpiece 5 generating a raised image point 8 or whether the electromagnetic radiation is not to be applied leaving a flat image point, thereby creating a plurality of identification marking elements where at predefined elevated image points, material extending beyond the opening extends into the opening.

Within the limits of technical capabilities, the identification marking can be placed in any desired location on the workpiece.

The identification marking of the molding is also one piece with the workpiece, and is therefore highly resistant to abrasion. The code can be deciphered even after the workpiece has been in use for a very long time, e.g. after the assembly of which it is a part fails.

Because the identification marking is applied directly during the molding process, the length of the manufacturing cycle is not significantly increased, no pre-treatment and/or post-treatment is necessary, and there is no need for finishing as such. The coding can also be used to identify the workpiece for later automatic assembly and for safety applications. The essential reference points of the method and of the apparatus are in the use of the method and apparatus during the mold manufacturing process, and the fact that the heat can be applied to each individual piece. The heat sources that can be used include but are not limited to laser light sources, and other heat sources such as infrared diodes or other focusable sources and/or sources of thermal radiation that can be conducted to the desired location can also be used.

What is claimed is:

1. A device for the identification marking of a workpiece which is made of a deformable material within a molding apparatus comprising:
   a base plate being part of the mold of the molding apparatus and being intended to be in contact with a workpiece to be formed, the base plate comprising a plurality of holes arranged in a pattern;
   a source of electromagnetic radiation to generate electromagnetic radiation; and
   guiding means to direct the electromagnetic radiation generated by the source of electromagnetic radiation through selected holes of the plurality of holes in the base plate to act upon the workpiece material adjacent to the respective holes so that material that is adjacent to the hole extends into the hole to create an image point.

2. The device as claimed in claim 1, wherein the electromagnetic radiation is generated by a laser.

3. The device as claimed in claim 2, wherein the electromagnetic radiation that is generated by a laser is guided through a plurality of optical fibers into a cavity that leads to a corresponding hole.

4. The device as claimed in claim 1, wherein the holes have a surface so that without the action of the electromagnetic radiation the material of the workpiece is essentially flat.

5. The device as claimed in claim 1, wherein the holes are circular and each transition into a cylindrical cavity.

6. The device as claimed in claim 1, wherein the base plate is replaceable in the device.

7. A method for marking a workpiece which is made of a deformable material with a workpiece identification marking within a molding apparatus, comprising the steps of:
   providing a device having a workpiece identification marking mold part of a mold of the molding apparatus, the workpiece identification mold including a plurality of openings;
   molding the workpiece in the mold; and
   marking the molded workpiece by a control device or guiding means that predetermines for each of the plurality of openings during the molding process of each workpiece being manufactured whether electromagnetic radiation is to be applied through the opening to the surface of the workpiece generating a raised image point or whether the electromagnetic radiation is not to be applied leaving a flat image point, thereby creating a plurality of identification marking elements where at predefined elevated image points, material extending beyond the opening extends into the opening.

8. The device as claimed in claim 2, wherein the holes have a surface so that without the action of the electromagnetic radiation through the material of the workpiece is essentially flat.

9. The device as claimed in claim 3, wherein the holes have a surface so that without the action of the electromagnetic radiation through the material of the workpiece is essentially flat.

10. The device as claimed in claim 2, wherein the holes are circular and each transition into a cylindrical cavity.

11. The device as claimed in claim 3, wherein the holes are circular and each transition into a cylindrical cavity.

12. The device as claimed in claim 4, wherein the holes are circular and each transition into a cylindrical cavity.

13. The device as claimed in claim 2, wherein the base plate is replaceable in the device.

14. The device as claimed in claim 3, wherein the base plate is replaceable in the device.

15. The device as claimed in claim 4, wherein the base plate is replaceable in the device.

16. The device as claimed in claim 5, wherein the base plate is replaceable in the device.

* * * * *